Dec. 27, 1966    T. FRANCIS ETAL    3,294,602
FLEXIBLE SELF-EXPANDABLE AND SELF-CONTAINED
UNIT WITH PYROTECHNIC SHEET
Filed Dec. 12, 1963
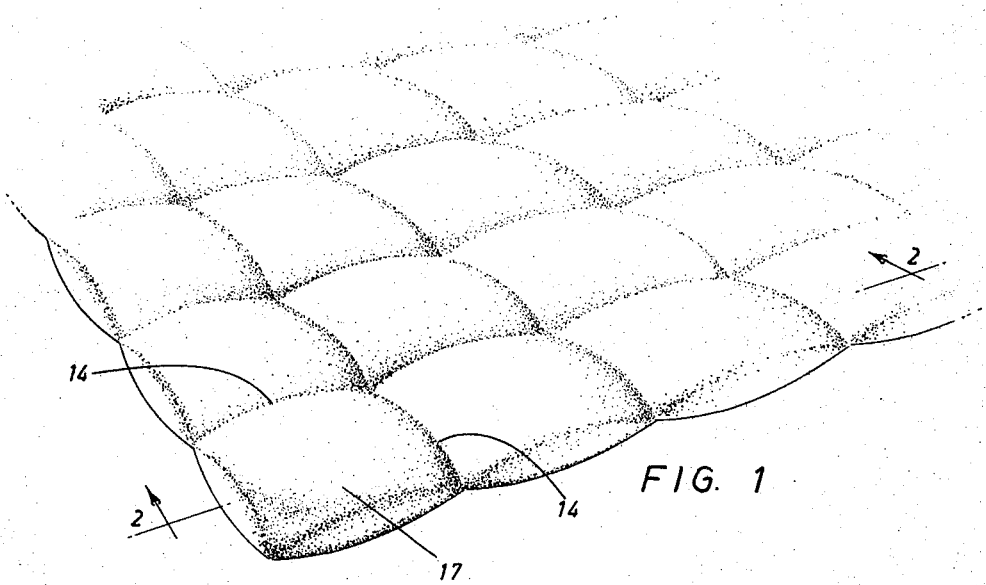
FIG. 1
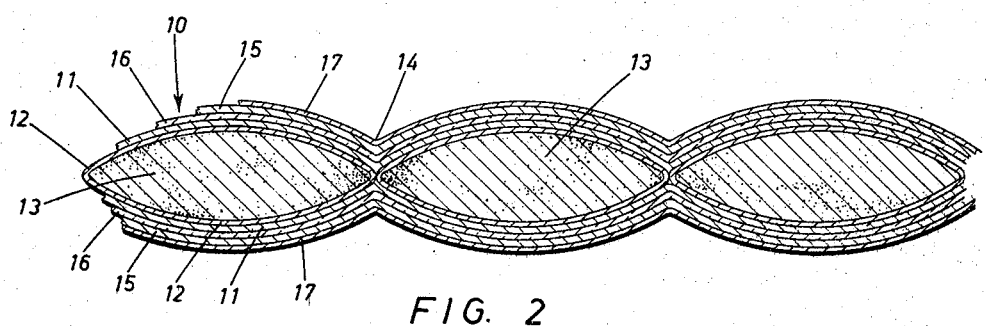
FIG. 2
THOMAS FRANCIS
JACK FRED FURRER
MAURICE HARRY JONES
GEORGE EDWIN MURRAY
MELANIE PATRICIA THORNE
INVENTORS
BY 
Attorney

United States Patent Office 3,294,602
Patented Dec. 27, 1966

3,294,602
FLEXIBLE SELF-EXPANDABLE AND SELF-CON-
TAINED UNIT WITH PYROTECHNIC SHEET
Thomas Francis, 197 Glen Park Ave., Toronto, Ontario,
Canada; Jack Fred Furrer, 129 Sedgemount Drive,
Wayland, Mass. 01778; Maurice H. Jones, 48A Sussex
Ave., Scarborough, Ontario, Canada; George Edwin
Murray, 22 Pequot Road, Lexington, Mass. 02173;
and Melanie P. Thorne, 29 Balfour St., Toronto, Ontario, Canada
Filed Dec. 12, 1963, Ser. No. 330,020
21 Claims. (Cl. 149—109)

This invention relates to a flexible, self-expandable and self-contained unit which advantageously may be in the form of a sheet. More particularly, this invention relates to a flexible, self-expandable and self-contained unit which can be employed for the rapid construction of foamed buildings or structures and the production of various foamed plastic articles and forms without the need for conventional foam-making equipment and under a wide range of ambient conditions.

A specific and important use of a unit embodying the present invention is in the production of foamed shelters and other cellular plastic articles for use by personnel, particularly military personnel, in remote and inaccessible areas, particularly in areas of extreme climatic conditions such as prevail in the Arctic.

Other uses of units embodying this invention are many and diverse and include all applications where the rapid production of foamed plastic structures, forms or articles without the need for conventional foam-making equipment is advantageous or beneficial. For example, units embodying this invention can be used for the rapid production of life rafts or similar articles utilizing the buoyancy properties of cellular plastic, in the production of light-weight rigid sheets of various sizes and thickness and, as aforementioned, for the production of foamed plastic shelters, wherein the rigidity, good structural properties and, in particular, the excellent thermal insulating properties of cellular plastic are utilized.

While the production of articles made from a foamable composition of matter under controlled conditions is a well established art, many difficulties have been encountered in the production of foamed plastic articles in the field over a wide range of climatic conditions. A flexible, self-expandable and self-contained sheet embodying the present invention enables most of the difficulties of producing foamed plastic products in an uncontrolled environment to be surmounted. More specifically, one of the major uses of a flexible, self-expandable and self-contained unit embodying this invention is in the production of semi-permanent, foamed plastic housing and storage facilities for use by military or other personnel in remote regions. A definite requirement currently exists for such housing and storage facilities, and several approaches to fulfilling this need by producing foamed plastic shelters in the field have been suggested in the past. The major previous approach has involved the spraying of a mixture of foamable liquids onto a pre-erected form or structure. While such a technique has been used to produce some structures under favourable climatic conditions, all spray systems involving liquid components suffer from several inherent disadvantages which handicap their use in field operation. For example, successful foam production from liquid components depends upon careful control of the temperature of the component liquids, as well as accurate metering and adequate mixing of all the necessary materials. This necessitates the use of special and heavy equipment for the pumping, metering and mixing of the materials. Such methods obviously are disadvantageous because of the high capital cost of the equipment, the necessity of transporting the equipment from one site to another, and the necessity of having skilled personnel present to operate the equipment. A further and very serious drawback of spraying techniques for the production of foamed plastic articles is that conventional liquid foam systems generally are functional over a very limited temperature range only and cannot be employed at subzero temperatures. This difficulty results from both the lowered reactivity of the component liquids at low temperatures and also differences in their temperature-viscosity characteristics, which complicate the metering operations. For example, it may be mentioned that the various isomers of tolylene diisocyanate, the most commonly employed liquid isocyanate for the production of polyurethane foams, are all free-flowing liquids at normal ambient temperatures, but are all solid materials at 0° C. A further drawback to conventional foam systems, in particular polyurethanes, for spray applications is that they are in general extremely sensitive to the presence of moisture, so that, quite apart from the limitations enforced by the temperature of the surroundings, such spray systems are limited to use under dry conditions or in sheltered areas. Yet another drawback to the use of conventional liquid foam systems, particularly in spray applications, is the health hazard to the operating personnel stemming from the usual high toxicity of one or more of the component liquids.

An alternative method for the production of foamed plastic shelters and other articles in the field involves preforming the structure in prefoamed sections which are subsequently combined in situ. To be of widespread applicability this technique also calls for the in-field production of foamed plastic articles over a wide range of ambient conditions. Suitably versatile foam systems of the type required are not currently available. While this technique could enable some limited use to be made of foamed plastics for shelter applications, transportation and other difficulties severely limit the widespread and general application of this procedure.

In order to realize the full potential of foam forming materials for in-field uses, convenient, rapid and versatile means for producing foamed plastic articles over a wide range of ambient conditions without the need for auxiliary foam-making equipment are required. In this way, transportation, storage and other problems are minimized by keeping the foam forming materials in an unreacted state until they are required.

A flexible, self-expandable and self-contained unit embodying the preferred concept of this invention overcomes the various disadvantages hereinbefore noted which are associated with the production of foamed plastic structures and various other useful foamed plastic articles in the field when using conventional foam-making techniques and procedures. Flexible, self-expandable and self-contained sheets embodying this invention can be fabricated to any desired shape or form, for example, a tent, and, as a result of the flexibility of the sheet, it is possible to manually fold the fabricated form to a minimum bulk for transportation and storage. At the appropriate time the sheet can be unfolded, erected over a supporting frame and the foaming reactions triggered so that the walls of the structure expand and become substantially rigid.

A flexible, self-expandable and self-contained unit embodying this invention comprises a first flexible layer and a second flexible layer, the second layer being associated in heat-transfer relationship with the first layer. The first layer comprises a foamable composition of matter adapted to foam and form itself into a substantially rigid layer of cellular plastic upon the applicaton of heat thereto. The second layer comprises means for generating and imparting sufficient heat to the first layer to cause foaming of the first layer.

This invention will become more apparent from the following detailed description taken in conjunction with the appended drawing, in which:

FIGURE 1 is a perspective view of a flexible, self-expandable and self-contained sheet embodying this invention, and FIGURE 2 is a section taken along line 2—2 in FIGURE 1.

FOAMABLE COMPOSITION OF MATTER

Those skilled in the art will appreciate that there are numerous foamable compositions of matter currently available that may be used in practicing this invention. The essential requirements of the foamable composition of matter are that it be capable of being formed into a flexible layer, and that it give rise to a rigid or semi-rigid cellular plastic layer when it is heated to a predetermined degree. The foamable composition of matter preferably should be storage stable for an appreciable time at normal ambient temperatures, and preferably it should be such that, when heated to the initiation temperature, an exothermic reaction resulting in rapid foaming and curing takes place.

While best results have been achieved with foamable compositions of matter in powdered form and packaged in thin, light-weight fabrics, papers or metallic or thermoplastic films, it will be appreciated that the foamable composition of matter could assume other forms, even to the extent of being a liquid, for example. The foamable composition of matter also could be pelletized by conventional techniques and the pellets adhered to a suitable substrate to form a flexible layer.

Foamable compositions of matter which are preferred for use in practicing this invention, and which are detailed herein for illustrative purposes only, take the form of a free-flowing, finely-divided powder of which the basic components are a polyepoxide, an amide, a blowing agent and a cell size controller. Representative and preferred formulations which are useful as the foamable composition of matter for a flexible, self-expandable and self-contained unit embodying this invention are listed hereinafter in Table I.

TABLE I

| Formulation | 1 | 2 | 3 | 4 | 5 |
|---|---|---|---|---|---|
| Tetraglycidyloxytetraphenyl-ethane (Epon 1031, Trademark), g | 1,000 | 1,000 | 1,000 | 1,000 | |
| Epoxy resin (Bisphenol A: Epichlorohydrin Condensate—Epoxide Eq.=400-600)—specifically Epon 1001 (Trademark) Eq.=500, g | | | | | 1,000 |
| 4:4′-diaminodiphenylsulphone, g | 125 | 250 | 250 | 250 | |
| 2,4 tolylenediamine, g | | | | | 60 |
| Oxybisbenzenesulphonylhydrazide, g | 120 | 100 | 68 | | 140 |
| Azobisformamide, g | | | | 16 | |
| Diazoaminobenzene, g | 60 | 100 | 68 | 56 | |
| Aluminum powder (1-10 microns), g | 320 | 400 | | | |
| Octyl Phenol, g | 80 | | | | |
| Cell Size Controller—condensate of ethylene oxide with propylene oxide—propylene glycol condensate (Pluronic F-68, Trademark), g | 20 | 20 | 20 | 20 | 20 |
| Initiation Temperature—(° C.) | 110 | 110 | 110 | 155 | 130 |
| Foam Density (lbs./cu.ft.) | 3.3 | 3.0 | 4.0 | 4.5 | 2.0 |

These epoxy foam powders are storage stable for an appreciable time at normal ambient temperatures and, when heated to their initiation temperature, give rise to rigid, or semi-rigid cellular plastics of low density. Above the initiation temperature, interaction between the components of the foam systems is rapid and exothermic, and the heat evolved serves to accelerate curing of the foamed plastic.

It should be noted that a novel feature of those formulations which involve diazoaminobenzene in combination with a sulphonylhydrazide is that the initiation temperature thereof is decreased compared with that of formulations involving either blowing agent alone. In addition the use of these mixed blowing agents permits the formation of foamed plastics of a lower density with less tendency towards internal charring.

It has been found that the aforementioned foamable compositions of matter for use in practicing this invention are improved by the inclusion of fillers such as calcium sulphate, talc, cellulose powder, aluminum dust and other inert materials. Addition of these fillers to the formulation serves to lower the core temperature attained during curing by virtue of the specific heat adsorbed, so that a larger percentage of blowing agent may be employed without detrimental side effects such as internal charring. In this way foam densities may be decreased. In addition these fillers act as modifiers to increase the viscosity of the system during foaming. If desirable, certain organic materials such as octyl phenol may be used to decrease the melt viscosity of the formulations and thus assist in even foam rise.

When selecting the constituents of a suitable foamable composition of matter care should be taken to avoid selection of constituents which will result in an imbalance in the rate of the reaction creating the polymer and the rate of the reaction involving the decomposition of the blowing agent, i.e. gas formation. Thus, if the polymerization reactions proceed too far before the onset of the blowing reaction, the mixture will rigidize before expansion, which, of course, is undesirable. On the other hand, if the gas generating reactions occur before the viscosity of the formulation has increased sufficiently by virtue of the polymerization reactions, the viscosity characteristics of the expanded, uncured mass often will be such that partial or complete collapse of the cellular structure will take place prior to or during rigidization, which, of course, also is not desirable.

Furthermore, care should be taken to select constituents which will not lead to an unduly high reaction exotherm so as to avoid charring of the cellular plastic product.

The formulations set out hereinbefore in Table I, while by no means exhaustive of foamable compositions of matter which may be used in practicing this invention, constitute preferred formulations which give rise to desirable end products not subject to the disadvantages hereinbefore enumerated.

A convenient technique for forming the aforementioned foamable powders into a flexible layer or sheet is to package the powders between thin fabrics, films or papers of thermoplastic materials or metal foil using quilting techniques. Procedures for carrying out these operations are well established, and suitable packaging media include fabrics of thermoplastic materials such as polyesters, polyamides and polyolefins, papers or films of thermoplastic materials and metal foils coated on one side thereof with a thermoplastic material.

Referring to FIGURE 2, there is shown a package 10 in the form of a flexible layer or sheet and which has flexible side walls 11 made from aluminum foil coated on the inside thereof with a thermoplastic material 12 such as polyethylene. Within the confines of side walls 11 package 10 contains a powdered foamable composition of matter 13. Package 10 is quilted lengthwise and widthwise as at 14, the quilting effect being achieved by heat-sealing thermoplastic materials 12 on opposite walls 11 together along lines 14. Such a package 10 is adequately strong and sufficiently light-weight to serve its intended purpose, and the heat seals are sufficiently heat sensitive that they rupture during foaming of the foamable composition of matter 13, so as to accommodate expansion of the foamable composition of matter.

HEATING MEANS

The function of the heating device, which is an essential component of a self-expandable, self-contained unit embodying this invention, is to generate and impart sufficient heat to the foamable composition of matter to cause foaming of the same. In addition to possessing characteristics necessary to serve this function, the heating device must be capable of being formed into a flexible layer. Moreover, the heating device should not produce excessively high temperatures which would result in charring of the foamed plastic.

Those skilled in the art will appreciate that numerous types of heating devices satisfying the foregoing requirements could be used in practicing this invention. It has been found, however, that the best results have been achieved by the use of a pyrotechnic sheet. While heating devices similar to electric heating pads might be employed, they would be costly and less convenient for use in remote areas.

Where a pyrotechnic sheet is employed, it is preferable that the burning of the pyrotechnic sheet should not involve the evolution of an excess of smoke or flame which could lead to the release of obnoxious odours and gaseous materials which could be detrimental to the health of personnel. Preferably the pyrotechnic sheet should be such that it will not be dependent upon the presence of oxygen for its proper operation and such that it will operate over a wide range of ambient conditions, particularly at subzero temperatures.

Pyrotechnic sheets which have been found to have the best combination of properties for use in conjunction with the aforementioned epoxy-amine foam systems have been found to be those containing a mixture of iron powder (5–20 microns) and elemental sulphur bound with asbestos fibres. These compositions preferably should contain iron powder and sulphur powder in a ratio of from 75:25 to 65:35 by weight and employ, as a bonding agent, asbestos fibre or a mixture of glass and asbestos fibres in a total amount corresponding to 2 to 20% by weight of the pyrotechnic sheet. Where glass fibres are employed with asbestos fibres, the strength of the sheet is improved. Such a pyrotechnic sheet is shown at 15 in the appended FIGURE 2 and may be formed by blending powdered iron and sulphur in a liquid medium with a small percentage of loose asbestos fibres or with loose asbestos fibres and glass fibres. The resultant slurry or pulp which is obtained can be made into a flexible sheet by conventional paper-making procedures involving the removal from the sheet of the liquid medium. Such a sheet has been found to have little tendency to dust. More specifically, on a laboratory scale suitable pyrotechnic sheets have been prepared by blending together iron powder (38 g.), sulphur powder (16 g.), asbestos fibre (3 g.) and glass fibre (3 g.) in methanol (700 ml.) for two minutes in a blender to yield a thick pulp. This pulp was poured onto a filter bed of a large vacuum filter apparatus and was spread to a uniform depth over the area of the bed. The pulp was filtered, and the pyrotechnic sheet so obtained was air-dried. Using the aforementioned procedure sheets were obtained which had desirable pyrotechnic properties when their weight per unit area was in excess of 0.1 pounds per square foot. Sheets of lowered heat output can be obtained by the mechanical reduction of the effective area of these sheets. This can be accomplished, for example, by punching holes through the pyrotechnic sheet to provide a discontinuous sheet having a mesh-type structure. Alternatively, mesh-type sheets may be prepared directly by a simple modification of the foregoing procedure.

Pyrotechnic sheets also may be formulated from calcium silicide with iron oxide ($Fe_2O_3$ or $Fe_3O_4$) bound with asbestos fibres. Other pyrotechnic compositions are iron and small amounts of zinc with sulphur, lead with sulphur, lead and iron with sulphur, $Pb_3O_4$ with calcium silicide, and mixtures of aluminum and silicon with lead chromate, all of which may be bound in sheet form with asbestos fibres. Such sheets are not as desirable as sheets employing sulphur and iron powder since none possess as desirable a balance of properties as the preferred sheets.

Where a pyrotechnic sheet is employed as the heating device, those skilled in the art will appreciate that such a sheet must not only be flexible, and be capable of transmitting the necessary amount of heat to the foamable composition of matter, but also burning of the sheet must be self-propagating.

FLEXIBLE, SELF-EXPANDABLE AND SELF-CONTAINED UNIT

A flexible, self-expandable and self-contained unit embodying this invention is shown in the appended figures wherein package 10 and pyrotechnic sheets 15 already have been described in detail.

In the practice of this invention it is necessary for the heating device to be in heat-transfer relationship with the foamable composition of matter. There are a number of ways to combine pyrotechnic sheet 15 and package 10 to meet this requirement. For example, a single pyrotechnic sheet 15 may be bonded to one side of package 10 by a suitable bonding agent or by means of fastening devices. It is preferable, however, that pyrotechnic sheets 15 be provided on both sides of package 10, as shown in FIGURE 2, so that package 10 is sandwiched between two pyrotechnic sheets. In either case it is preferred that the pyrotechnic sheets be separated from package 10 by means of a thin, flexible, thermal insulating sheet which is shown at 16 in FIGURE 2 and which serves to assist in preventing charring of the foamed plastic. Materials which have been found suitable for sheet 16 include thin papers or fabrics of fibreglass or asbestos or combinations of fibreglass and asbestos. Preferably thermal insulating sheets also are placed on the outer surface of pyrotechnic sheets 15, these outer, thermal insulating sheets being numbered 17. Any suitable bonding agent or fastening devices may be employed to bond sheets 15, 16 and 17 together and to bond sheet 16 to package 10. On the other hand, sheets 17 could be formed into an envelope or bag holding sheets 15 and 16 and package 10 in position therein.

It has been found that for a flexible, self-expandable and self-contained unit incorporating the all-solid epoxy foam systems referred to hereinbefore, and pyrotechnic sheets based on mixtures of iron and sulphur bound with asbestos, the amount of pyrotechnic materials (iron and sulphur) required for foam initiation varies from 20 to 60% by weight of the foamable composition of matter, depending upon the foamable composition of matter involved and the ambient temperature. For best results it has been found advantageous to supply the major part of the heat from the bottom of the unit when the unit is foamed in a horizontal or near horizontal position.

Flexible, self-expandable and self-contained units embodying this invention and of the type shown in the appended figures has been found to operate successfully at ambient temperatures of from —40° F. to +90° F.

A flexible, self-expandable and self-contained unit which is the subject of this invention is further illustrated by the following examples.

Example I

A foamable powder was prepared from the following components:

| | G. |
|---|---|
| Tetraglycidyloxytetraphenylethane (Epon 1031, trademark) | 1000 |
| 4:4'-diaminodiphenylsulphone | 125 |
| Oxybisbenzene-4:4' sulphonylhydrazide | 120 |
| Diazoaminobenzene | 60 |
| Aluminum powder | 320 |
| Pluronic F-68 (trademark) | 20 |
| Octyl phenol | 80 |

The powdered foamable composition of matter was packed in 42 g. portions into each section of a channelled bag constructed as follows from polyethylene coated aluminum foil:

Two sheets (9" x 12") of coated foil were laid face to face with their coated faces together. The sheets were bonded together by heat sealing to give a channelled bag with six channels running across the width of the bag two inches apart and open at one end.

After the envelope was packed with foamable powder, the open ends of the channels were heat sealed.

Two pyrotechnic heating sheets were prepared by blending together, in an inert liquid medium such as water or methanol, iron powder (25 g.), sulphur (11 g.) and asbestos fibre (4 g.) and the product was filtered. The pyrotechnic sheets were then sandwiched between two thin fibreglass fabrics or two thin asbestos papers. The resultant sheets were bonded to the faces of the aluminum envelope to produce a flexible, self-expandable and self-contained sheet.

Upon ignition of each of the pyrotechnic sheets at an ambient temperature of 70° F., the pyrotechnic sheets burned, and the package containing the foamable composition of matter subsequently expanded to produce a 3 inch layer of rigid foam having a core density of 4.1 lbs./cu. ft. The original thickness of the sheet before foaming was about 0.35 inch.

Example II

Example I was repeated using a foamable powder prepared from the following components:

| | G. |
|---|---|
| Tetraglycidyloxytetraphenylethane (Epon 1031, trademark) | 1000 |
| 4:4'-diaminodiphenylsulphone | 250 |
| Oxybisbenzenesulphonylhydrazide | 100 |
| Diazoaminobenzene | 100 |
| Aluminum powder | 400 |
| Pluronic F-68 (trademark) | 20 |

The self-expandable sheet contained foamable and pyrotechnic components in the same ratio as that in Example I. The foamed product obtained after ignition of the pyrotechnic sheets in this case had a core density of 3.3 lbs./cu. ft.

Example III

Example II was repeated using the same foamable composition of matter in the same amount, but using mesh type pyrotechnic sheets weighing 30 g. and 70 g., the heavier sheet being bonded to the lower face of the aluminum envelope and the lighter one to the top. Ignition of the pyrotechnic sheets at an ambient temperature of 70° F. caused expansion of the foamable material to a cellular plastic product having a density of 3.0 lbs./cu. ft.

Example IV

The foamable powder used in Example II (2 kg.) was uniformly packaged in a channelled envelope (3' x 2') of polyethylene-coated aluminum foil to give a thin, flexible sheet. A flexible, mesh type, pyrotechnic sheet weighing 620 g. was bonded to the lower face of the envelope, and a thin fibreglass fabric was bonded to the top of the envelope.

Burning of the pyrotechnic sheet at an ambient temperature of 80° F. caused expansion of the foamable powder and resulted in a cellular plastic product having a core density of 3.3 lbs./cu. ft.

Example V

Example III was repeated using mesh type, pyrotechnic sheets weighing 40 g. and 80 g., the heavier sheet being bonded to the lower face of the envelope and the lighter sheet to the top. The composite, self-contained sheet so obtained was cooled to −20° F., and the pyrotechnic sheets then were ignited simultaneously. The product from this procedure was a 3 inch layer of rigid foam.

Example VI

Example V was repeated, the composite sheet being cooled to −40° F. before ignition of the pyrotechnic sheets. A cellular plastic product of low density resulted from this procedure.

Example VII

Example I was repeated using the foamable powder described in Example II (252 g.) and a single, mesh type, pyrotechnic sheet weighing 120 gm. bonded to one face of the envelope. The expandable sheet was cooled to −40° F. With the composite sheet held in a horizontal position and the pyrotechnic sheet located on the bottom of the envelope, the pyrotechnic sheet was ignited. The foamable powder subsequently expanded to a rigid cellular product of low density.

Example VIII

Example III was repeated using a foamable powder prepared from the following components:

| | Grams |
|---|---|
| Epoxy resin (Bisphenol A: Epichlorohydrin Condensate-Epoxide Eq.=500 e.g. Epon 1001) | 1000 |
| 2,4-tolylenediamine | 60 |
| Oxybisbenzenesulphonylhydrazide | 140 |
| Pluronic F-68 (trademark) | 20 |

The foamed plastic product obtained in this case had a core density of 2.5 lbs./cu. ft.

While preferred embodiments of this invention have been set out in detail herein, those skilled in the art will appreciate that changes and modifications may be made therein without departing from the spirit and scope of this invention as defined in the appended claims.

What we claim as our invention is:

1. A flexible, self-expandable and self-contained unit comprising a first flexible layer and a second flexible layer, said second layer being associated in heat-transfer relationship with said first layer, said first layer comprising a foamable composition of matter adapted to foam and form itself into a substantially rigid layer of cellular plastic upon the application of heat thereto, said second layer comprising means for generating and imparting sufficient heat to said first layer to cause foaming of said first layer.

2. A flexible, self-expandable, self-contained unit according to claim 1 wherein said second layer comprises a flexible pyrotechnic sheet that is paper-like in physical structure in that said sheet is comprised of a matrix of intermingled fibres.

3. A flexible, self-expandable, self-contained unit according to claim 2 wherein said pyrotechnic sheet is adapted to burn without oxygen being present in the atmosphere in which said sheet is burned.

4. A flexible, self-expandable, self-contained unit according to claim 3 wherein said pyrotechnic sheet comprises a mixture of iron powder and elemental sulphur bound with a material selected from the class consisting of asbestos fibres, and mixtures of asbestos fibres and glass fibres, said mixture being bound by and distributed throughout said fibres.

5. A flexible, self-expandable, self-contained unit according to claim 4 wherein said mixture contains from 75% to 65% by weight of said iron powder and from 25% to 35% by weight of said elemental sulphur, said material constituting from 2% to 20% by weight of said sheet.

6. A flexible, self-expandable, self-contained unit according to claim 1 wherein said foamable composition of matter comprises a polyepoxide, an amine, a blowing agent and a cell size controller.

7. A flexible, self-expandable, self-contained unit according to claim 1 wherein said foamable composition of matter comprises tetraglycidyloxytetraphenylethane, 4:4'-diaminodiphenylsulphone, oxybisbenzenesulphonylhydrazide, diazoaminobenzene and a cell size controller.

8. A flexible, self-expandable, self-contained unit according to claim 7 wherein said foamable composition of matter includes an inert filler.

9. A flexible, self-expandable, self-contained unit according to claim 8 wherein said filler is aluminum powder.

10. A flexible, self-expandable, self-contained unit according to claim 1 wherein said foamable composition of matter comprises tetraglycidyloxytetraphenylethane, 4:4'-diaminodiphenylsulphone, azobisformamide, diazoaminobenzene and a cell size controller.

11. A flexible, self-expandable, self-contained unit according to claim 1 wherein said foamable composition of matter comprises an epoxy resin obtained from the condensation of epichlorohydrin and bisphenol A having an epoxide equivalent of 400–600, 2:4 tolylenediamine, oxybisbenzenesulphonylhydrazide and a cell size controller.

12. A flexible, self-expandable, self-contained unit comprising a flexible package comprising flexible walls containing a foamable composition of matter therebetween, said foamable composition of matter being adapted to foam and form itself into a substantially rigid layer of cellular plastic upon the application of heat thereto, and flexible means in heat-transfer relationship with said package for generating and imparting sufficient heat to said package to cause foaming of said foamable composition of matter.

13. A flexible, self-expandable, self-contained unit according to claim 12 wherein said foamable composition of matter is in powdered form.

14. A flexible, self-expandable, self-contained unit according to claim 13 wherein said package is quilted.

15. A flexible, self-expandable, self-contained unit according to claim 13 wherein said walls comprise metallic foil remote from said foamable composition of matter and backed with a thermoplastic film adjacent said foamable composition of matter, opposite ones of said walls being heat sealed together at spaced-apart intervals, whereby said package is quilted.

16. A flexible, self-expandable, self-contained unit according to claim 12 including a flexible sheet of thermal insulating material positioned between said walls and said flexible means for generating and imparting heat to said package.

17. A flexible, self-expandable, self-contained unit according to claim 12 wherein said flexible means for generating and imparting heat to said package comprises a flexible pyrotechnic sheet that is paper-like in physical structure in that said sheet is comprised of a matrix of intermingled fibres and includes a powdered pyrotechnic composition bound by and distributed throughout said fibres.

18. A flexible, self-expandable, self-contained unit according to claim 13 wherein said flexible means for generating and imparting heat to said package comprises a flexible pyrotechnic sheet that is paper-like in physical structure in that said sheet is comprised of a matrix of intermingled fibres and includes a powdered pyrotechnic composition bound by and distributed throughout said fibres, said sheet being adapted to burn without oxygen being present in the atmosphere in which said sheet is burned.

19. A flexible, self-expandable, self-contained unit according to claim 18 wherein said package is quilted.

20. A flexible, self-expandable, self-contained sheet according to claim 18 wherein said walls comprise metallic foil remote from said foamable composition of matter and backed with a thermoplastic film adjacent said foamable composition of matter, opposite ones of said walls being heat-sealed together at spaced-apart intervals, whereby said package is quilted.

21. A flexible, self-expandable, self-contained sheet according to claim 20 including a flexible sheet of thermal insulating material positioned between said walls and said pyrotechnic sheet, and a flexible sheet of thermal insulating material positioned over the outer surface of said pyrotechnic sheet.

References Cited by the Examiner

Popular Mechanics, Instant Space Huts Will Be Lunar Living Quarters, November 1962, p. 131.

BENJAMIN R. PADGETT, *Primary Examiner.*

S. J. LECHERT, JR., *Assistant Examiner.*